Oct. 31, 1961
M. R. LINAN
3,006,063
BRUSH SPRING INSTALLER
Filed Aug. 25, 1959
2 Sheets-Sheet 1
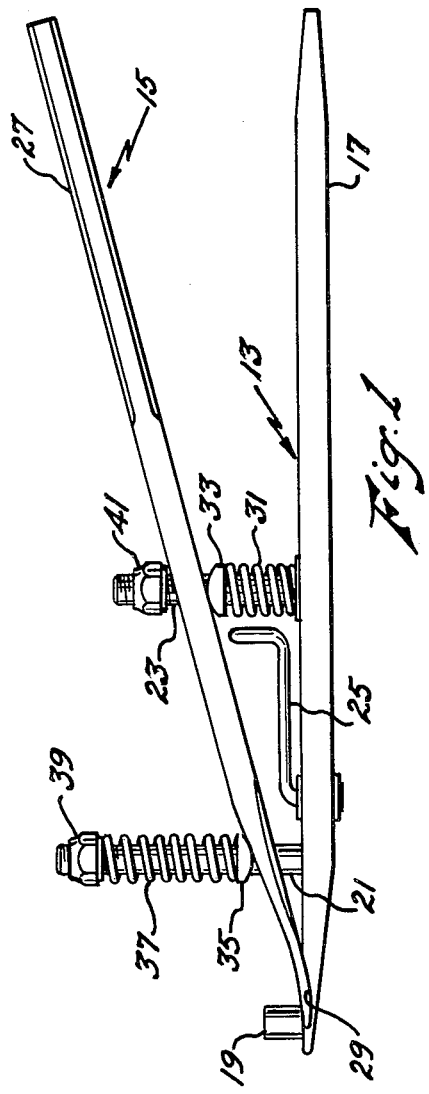
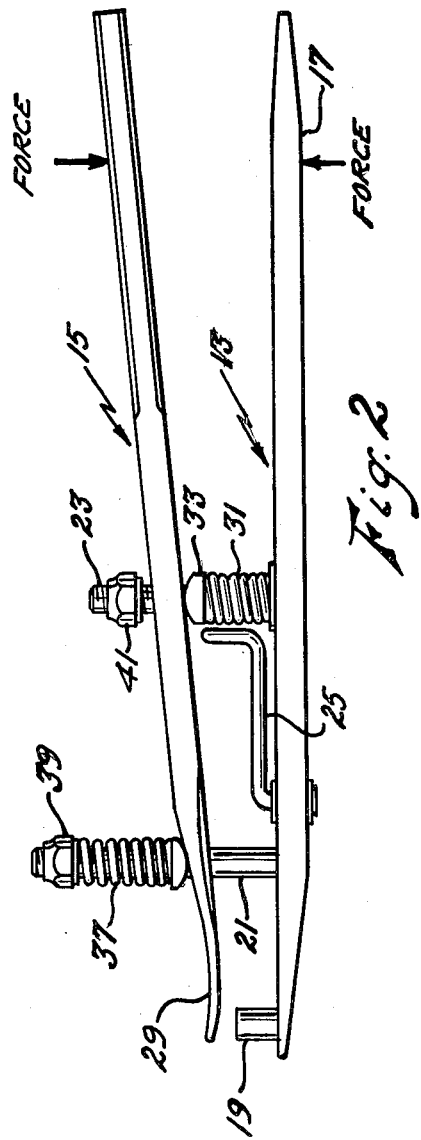
INVENTOR.
MARTIN R. LINAN
BY
ATTORNEYS Oct. 31, 1961     M. R. LINAN     3,006,063
BRUSH SPRING INSTALLER
Filed Aug. 25, 1959     2 Sheets-Sheet 2
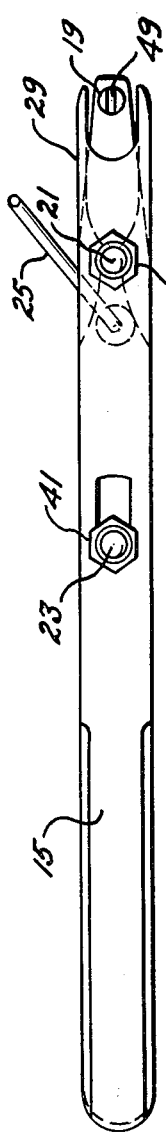
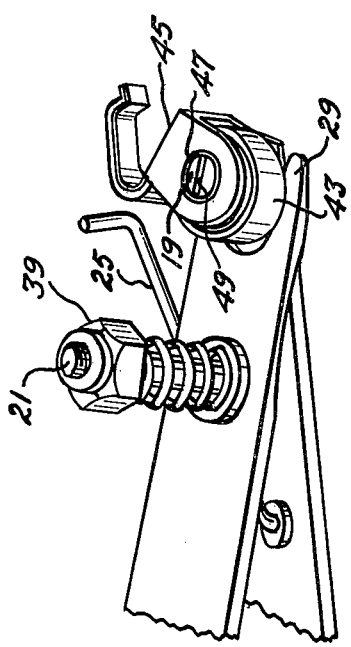
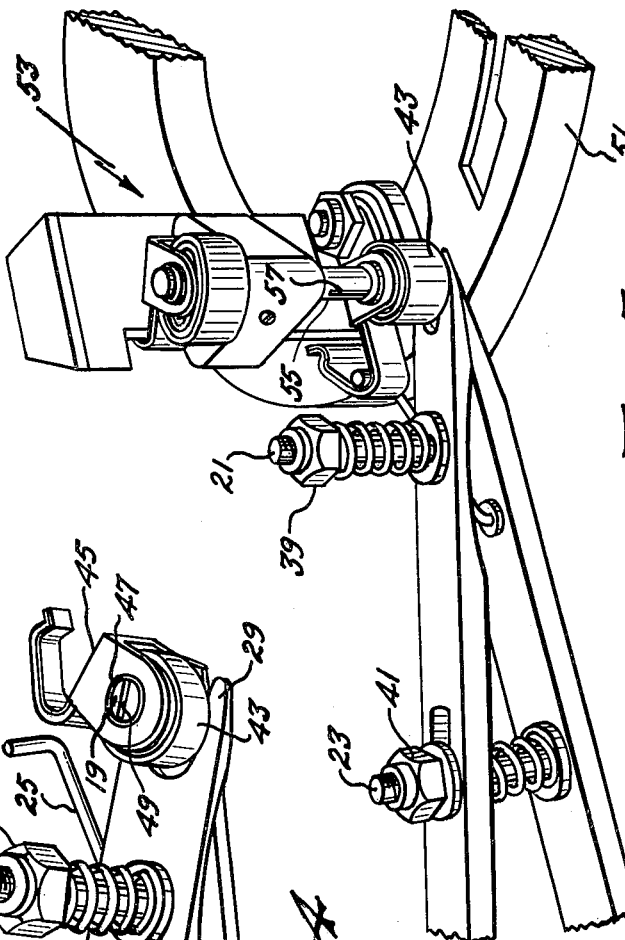
INVENTOR.
MARTIN R. LINAN
BY Wade Loonty
Arsen Tashjian
ATTORNEYS

3,006,063
BRUSH SPRING INSTALLER
Martin R. Linan, 319 McKay Ave., San Antonio, Tex.
Filed Aug. 25, 1959, Ser. No. 836,041
3 Claims. (Cl. 29—205)
(Granted under Title 35, U.S. Code (1952), sec. 266)

The invention described herein may be manufactured and used by or for the United States Government for governmental purposes without payment to me of any royalty thereon.

This invention relates to a hand tool for installing brush springs and more particularly to a tool which is useful for installing spiral brush springs such as those used on aircraft motors and generators.

In the maintenance of aircraft, both military and civilian, one of the troublesome and time consuming tasks includes the inspection and replacement, where necessary, of the brushes in the many motors and generators required for proper operation of the aircraft. The brushes are normally held in position by spiral springs which operate to urge the brushes toward the moving commutator and hold them in contact therewith. Normally, these brushes must be removed in order to be inspected and many difficulties are encountered during reassembly when it becomes necessary to install the inspected or new brushes.

One or more screwdrivers or various types of hook tools are presently used to perform the installation operation. This has proved unsatisfactory particularly because of injury to the mechanic caused by slipping and also damage to the brushes, springs and brush holders. Many times this damage is not clearly evident and dangerous operational failure can result.

Accordingly, it is an object of the present invention to provide a tool which is simple and convenient to use for installing brush springs in position on aircraft and other motor and generator equipment.

Another object of the invention is to provide a tool for installing brush springs which can be operated with one hand, freeing the other hand for safe manipulation of the brush or other necessary functions.

Still another object of the invention is to provide a brush installing tool which is simple to operate and requires no special instructions or practice for efficient use and operation by the average aircraft mechanic.

A still further object of the invention is the provision of apparatus for installing brush springs which is safe to use and which is not apt to cause any damage, either apparent or hidden, to any of the related equipment or structure.

These and other objects, features and advantages will become more apparent by reference to the following detailed description taken in connection with the accompanying drawings wherein:

FIG. 1 is a general view in side elevation of the invention ready for mounting the brush spring in position thereon;

FIG. 2 is a view in side elevation showing the tool after the release of the brush spring;

FIG. 3 is a plan view of the tool assembly shown in FIG. 1;

FIG. 4 is an enlarged view in perspective of the loading end of the tool showing a brush spring in position prior to hooking to spring retainer; and FIG. 5 is a view in perspective of the tool loaded and ready for insertion of the brush spring on a generator end plate brush post.

Referring to the drawings, FIG. 1 shows the tool which is comprised of two primary members, the holder 13 and the lifter 15. The holder 13 includes a handle portion 17 at one end and a post 19 for receiving the inner tang of a spiral brush spring on the other end. A stud member 21 having one end permanently affixed to the holder 13 extends upwardly therefrom near the post 19. Another stud member 23 is similarly affixed to the holder 13 near the handle portion 17. Between the two stud members, there is disposed a pivotable L-shaped hook member 25 which is adapted to swivel freely about an axis perpendicular to the holder 13 and parallel to the upright stud members 21 and 23.

The lifter 15 is provided with a handle portion 27 and a jaw portion 29 and includes two clearance holes for receiving the studs 21 and 23. The stud 23 includes, adjacent to the holder 13, a coil spring 31 with a spring seat 33 thereover. The lifter 15 is then placed substantially parallel with the holder 13 so that stud 21 alone and the free end of stud 23 having spring 31 and spring seat 33 attached, pass through the two respective clearance holes in the lifter 15. A spring seat 35 is placed over the stud 21 adjacent to and over the lifter 15 and a coil spring 37 is placed over the spring seat 35. The nuts 39 and 41 are tightened on the studs 21 and 23 respectively and operate to place a small compression load on the coil springs 37 and 31 as well as to retain the holder 13 and lifter 15 in assembled relationship to each other.

In FIG. 4 a conventional spiral brush spring 43 and brush spring guide 45 are in position. The inner tang 47 of the brush spring 43 is disposed in the slot 49 of the post 19. In practice, the brush spring 43 with guide 45 is forced around in the counterclockwise direction and hooked around the hook member 25. A conventional generator end plate 51 shown in FIG. 5 is usually provided with a brush rigging 53 which includes one or more brush spring posts 55 having the tang receiving slots 57. The latter figure shows the installing tool in position ready for installation of the brush spring 43.

In operation, the brush spring installer is utilized by first placing a brush spring 43 with its brush spring guide 45 over the post 19 so that the inner tang 47 fits into the slot 49 of the post 19. The spring 43 and guide 45 are then hooked around the pivotable hook member 25. The installer which is now loaded and ready for use is positioned so that the slotted post 19 and the brush spring post 55 are in axial alignment with one another and the respective slots 49 and 57 are also in line. By pressing the lifter handle 27 in the direction of the holder handle 17, the spring and guide are forced off the post 19 and onto the brush spring post 55, the inner tang 47 sliding out of the slot 49 and into the slot 57. The hook member 25 releases itself automatically when the spring seats on the brush spring post 55. The installer now appears as shown in FIG. 2, both coil springs 31 and 37 in the compressed state. Release of the handles returns the installer to position shown in FIG. 1 placing the tool in condition for reuse.

Although only certain embodiments of my invention have been shown and described herein it will be apparent to those skilled in the art that various changes may be made in the construction and relative shape and size of the elements without departing from the true spirit and scope of the appended claims.

What I claim is:

1. Apparatus for installing brush springs in aircraft generators and the like comprising an elongated holder including a handle portion at one end thereof, a first slotted post disposed on the other end of said holder, a lifter pivotally connected to and in angular relationship with said holder, said lifter having a handle portion at one end thereof, a forked jaw disposed on the other end of said lifter, said first slotted post extending through said forked jaw, a pivotable hook member disposed on said holder near said first post, said first slotted post being adapted to receive and retain a brush spring having a hooked portion adapted for engagement with said pivotable hook member, the compression of said handle ends operating to force the spring off said first slotted post and onto a second slotted post on a generator end plate, said pivotable hook member releasing said spring after installation on the generator end plate.

2. In an installing tool for mounting a brush spring on a generator end plate and the like, an elongated holder having a handle portion at one end thereof, a slotted post for receiving a brush spring inner tang disposed on the other end of said holder, a lifter having a handle portion at one end thereof, a forked jaw disposed on the other end of said lifter, means for mounting said lifter at an acute angle with respect to said holder, said slotted post and said jaw meeting to form the apex of the acute angle, a hook member pivotably disposed on said holder near said slotted post, said hook member being positioned to receive and retain the outer tang portion of said brush spring while in a compressed state, said holder and lifter being constructed and arranged upon the drawing together of the handle portions thereof to release said compressed brush spring, and biasing means for restoring said holder and lifter to their normal acute angular relationship.

3. In an installing tool for mounting a brush spring on a generator end plate or the like, an elongated holder having a handle portion at one end thereof, a slotted post for receiving a brush spring inner tang disposed on the other end of said holder, a first stud member extending upwardly from said holder near said slotted post, a second stud member extending upwardly from said holder near said handle portion, a pivotally attached L-shaped hook disposed between said first and second stud members, an elongated lifter having a handle portion at one end thereof, a fork type jaw disposed on the other end of said lifter, said stud members passing through axially aligned apertures in said lifter, a first biasing means placed on said first stud member to urge said lifter downwardly against said holder, a second biasing means placed on said second stud member to urge the handle portion of said lifter away from the handle portion of said holder.

References Cited in the file of this patent

UNITED STATES PATENTS

| 80,998 | Phelps | Aug. 11, 1868 |
| 641,019 | Kiefer et al. | Jan. 9, 1900 |
| 2,529,599 | Dick | Nov. 14, 1950 |
| 2,832,128 | Erdmann | Apr. 29, 1958 |

FOREIGN PATENTS

| 255,976 | Germany | Jan. 27, 1913 |